United States Patent [19]

Mikura et al.

[11] 4,298,631
[45] Nov. 3, 1981

[54] METHOD FOR SMOOTHING BOTH MAGNETIC COAT LAYERS OF MAGNETIC RECORDING MEDIUM

[75] Inventors: Chiho Mikura; Fujio Shibata, both of Tokyo, Japan

[73] Assignee: TDK Electronics Co., Ltd., Tokyo, Japan

[21] Appl. No.: 156,405

[22] Filed: Jun. 4, 1980

Related U.S. Application Data

[63] Continuation-in-part of Ser. No. 20,063, Mar. 13, 1979, abandoned.

[30] Foreign Application Priority Data

Apr. 10, 1978 [JP] Japan .................................. 53-41855

[51] Int. Cl.³ ............................................. B05D 5/12
[52] U.S. Cl. ..................................... 427/130; 428/900
[58] Field of Search ......................... 427/130; 428/900

[56] References Cited

U.S. PATENT DOCUMENTS

| 2,688,567 | 9/1954 | Franck | 117/64 |
| 3,473,960 | 10/1969 | Jacobson et al. | 117/237 |
| 4,100,326 | 7/1978 | Somezawa et al. | 427/130 |

FOREIGN PATENT DOCUMENTS

| 653250 | 5/1951 | United Kingdom | 427/128 |
| 910341 | 11/1962 | United Kingdom . | |

*Primary Examiner*—Bernard D. Pianalto
*Attorney, Agent, or Firm*—Oblon, Fisher, Spivak, McClelland & Maier

[57] ABSTRACT

Both solid magnetic coat layers formed on a substrate of a magnetic recording medium by coating a magnetic varnish are simultaneously smoothed by passing the magnetic recording medium between one or more pairs of rigid rotary rolls which press both magnetic coat layers during their rotation.

3 Claims, 2 Drawing Figures

METHOD FOR SMOOTHING BOTH MAGNETIC COAT LAYERS OF MAGNETIC RECORDING MEDIUM

The present application is a Continuation-In-Part of U.S. Application Ser. No. 020,063, filed on Mar. 13, 1979, abandoned.

BACKGROUND OF THE INVENTION

1. Field of the Invention

The present invention relates to a system for smoothing both magnetic coat layers of a magnetic recording medium.

2. Description of the Prior Art

FIG. 1 shows a conventional system for smoothing a magnetic layer coated on a substrate made of polyester etc. for a magnetic recording medium.

In the conventional system, a metallic rotary roll 2 and an elastic rotary roll 3 are respectively contacted with a magnetic coat layer 1a on a non-magnetic coat surface 1b of a magnetic recording medium 1 passing to the arrow direction a to press the magnetic coat layer.

The following disadvantages are caused if the conventional system is applied for smoothing a magnetic recording medium such as a flexible disc magnetic recording medium which has magnetic coat layers on both surfaces.

Concave deformation of the elastic rotary roll 3 having large elasticity is caused by a difference of elasticities of the elastic rotary roll 3 and the metal rotary roll 2 whereby the peripheral speed of the elastic rotary roll 3 at the contact part against the metal rotary roll 2 is faster than that of the metal rotary roll 2 to wear the magnetic coat layer and calender processing damage is caused. The calender processing damage causes a dropout. Therefore, the conventional system is not suitable for smoothing both magnetic coat layers of a magnetic recording medium.

In order to overcome said disadvantages of the conventional smoothing system, a hot press system has been proposed however, the hot press system has a disadvantage of inferior processing efficiency.

SUMMARY OF THE INVENTION

It is an object of the present invention to provide a system for smoothing simultaneously both solid magnetic layers of a magnetic medium without wearing the magnetic coat layer to cause calender processing damage, with high processing efficiency at high speed.

The foregoing and other objects of the present invention have been attained by providing a system for smoothing simultaneously both solid magnetic coat layers formed on a substrate of a magnetic recording medium which comprises passing the magnetic recording medium between one or more pairs of rigid rotary rolls which press each magnetic coat layer during their rotation.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
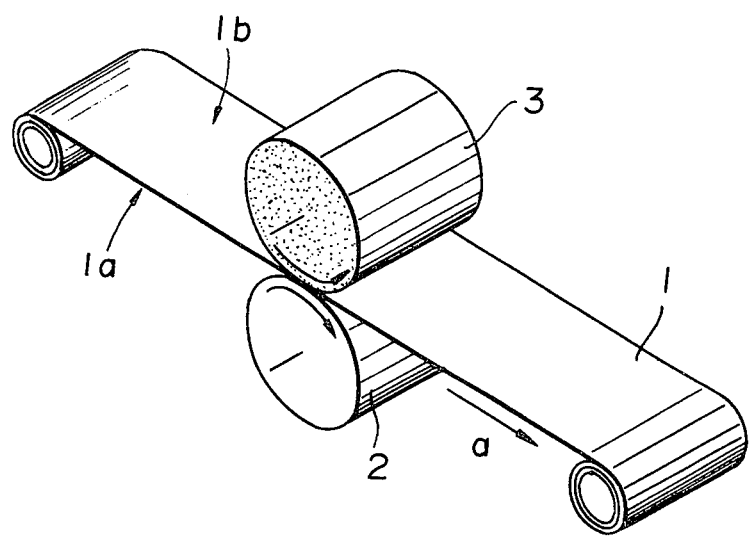
FIG. 1 is a schematic view of a conventional system for smoothing one magnetic coat layer of a magnetic recording medium.
Figure 2:
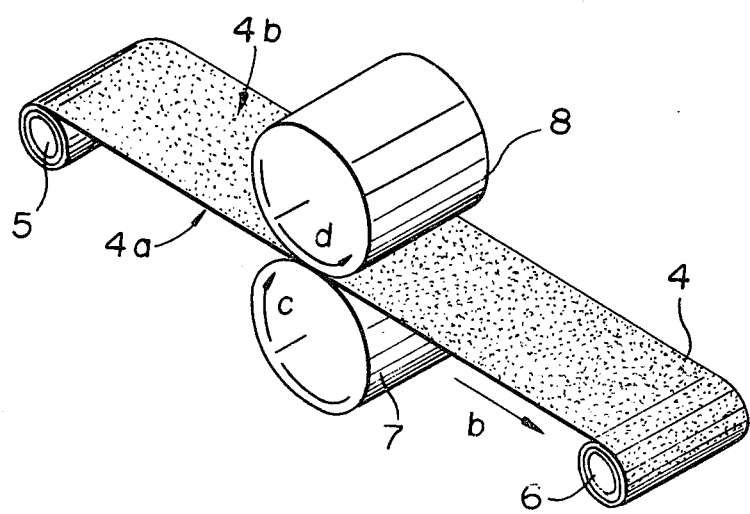
FIG. 2 is a schematic view of one embodiment of the system of the present invention.

Referring to FIG. 2, the system for smoothing simultaneously both solid magnetic coat layers formed on a substrate of a magnetic recording medium will be illustrated.

In FIG. 2, both magnetic coat layers 4a, 4b are formed on a flexible magnetic recording medium 4. The magnetic recording medium 4 is fed from a feed roll 5 to a take-up roll 6 in the arrow direction b. A pair of rolls 7, 8 are rigid rotary rolls having substantially same modulus of elasticity and which are made of metal etc., at least at a peripheral surface.

The pair of the rigid rotary rolls 7, 8 are contacted so as to hold the magnetic recording medium 4 in its full width under pressure and are rotated to the arrow directions c, d corresponding to passing direction b of the flexible magnetic recording medium 4.

In the system of the present invention, deformation of the rigid rotary rolls 7, 8 is not caused whereby there is no possibility of causing a variation of peripheral speeds of the rigid rotary rolls 7, 8 which is caused by deformation of peripheral surfaces of the rolls. Therefore, calender processing damage is not caused on either of the solid magnetic coat layers of the magnetic recording medium and the smoothing of the magnetic coat layers can be performed at high speed. In the system, balance and the degree of the pressures of the rigid rotary rolls applied on both of the solid magnetic coat layers are remarkably important for smoothing the magnetic coat layers. It is important to apply substantially equal pressure by the rotary rolls. The pressure applied by the rotary rolls is varied depending upon the balance of the peripheral speeds of the rotary rolls. It is important to control the peripheral speeds of a pair of the rotary rolls so as to prevent slippage.

The pressure applied to the magnetic coat layers between a pair of the rigid rotary rolls should be controlled so as to apply a desired pressure on the solid magnetic coat layer so as to attain a desirable smoothing effect.

In order to attain desired smoothing effect for the solid magnetic coat layers, the rigid rotary roll can be heated or the magnetic recording medium can be heated, if necessary.

In the embodiment of FIG. 2, only one pair of the rigid rotary rolls 7, 8 are used. However, it is possible to use two or more pairs of the rigid rotary rolls. Both of the solid magnetic coat layers of the magnetic recording medium can be processed to superior fine smoothness by increasing the number of pairs of the rigid rotary rolls.

In accordance with the system of the present invention, at least one pair of rigid rotary rolls holding the passing magnetic recording medium to press both solid magnetic coat layers are used in the system for smoothing simultaneously both magnetic coat layers of the magnetic recording medium whereby any calender processing damage is not caused, both solid magnetic coat layers can be smoothed at high speed, any drop error can be prevented and processing efficiency can be improved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for simultaneously smoothing both magnetic coating layers of a recording medium having solid magnetic coatings disposed on both sides thereof, said method comprising:

winding on a feed roll, a recording medium including solid magnetic coatings disposed on both sides thereof;

disposing at least one pair of rigid rotary rolls positioned between said feed roll and a take-up roll, the rolls of each of said at least one pair having identical moduli of elasticity, said rolls of each of said at least one pair of rolls being contacted with a predetermined pressure;

unwinding said recording medium from said feed roll;

receiving said recording medium between said contacting rolls for smoothing said solid magnetic coatings; and taking up said recording medium on said take-up roll, whereby calendar damage of said solid magnetic coatings is prevented.

2. The method of claim 1 including the step of heating said rollers.

3. The method of claim 1, including the step of heating said recording medium.

* * * * *